United States Patent [19]

Beach, Jr. et al.

[11] Patent Number: 5,201,888
[45] Date of Patent: Apr. 13, 1993

[54] TEMPERATURE CONTROL SYSTEM FOR REFRIGERATOR/FREEZER COMBINATIONS

[75] Inventors: Sammie C. Beach, Jr., Greenville; Gary R. Peter, Rockford, both of Mich.

[73] Assignee: White Consolidated Industries, Inc., Cleveland, Ohio

[21] Appl. No.: 792,308

[22] Filed: Nov. 14, 1991

[51] Int. Cl.⁵ ............................................. F25D 17/08
[52] U.S. Cl. ........................................ 62/187; 62/275; 251/129.13
[58] Field of Search ................................ 62/187, 275; 251/129.11, 129.12, 129.13

[56] References Cited

U.S. PATENT DOCUMENTS

| | | |
|---|---|---|
| 3,288,370 | 11/1965 | Mingrone et al. . |
| 3,488,030 | 1/1970 | Hulme et al. ................... 251/129.12 |
| 4,276,754 | 7/1981 | Ty . |
| 4,282,720 | 8/1981 | Stottmann et al. . |
| 4,527,734 | 7/1985 | Swain et al. ..................... 62/187 X |
| 4,530,217 | 7/1985 | Alluto et al. ..................... 62/156 |
| 4,682,474 | 7/1987 | Janke . |
| 4,688,393 | 8/1987 | Linstromberg et al. . |
| 4,732,010 | 3/1988 | Linstromberg et al. . |
| 4,819,442 | 4/1989 | Sepso et al. . |
| 4,850,319 | 7/1989 | Imoehl ........................ 251/129.11 X |
| 4,920,758 | 5/1990 | Janke et al. . |
| 4,924,680 | 5/1990 | Janke et al. . |
| 4,957,274 | 9/1990 | Hood et al. ................. 251/129.11 X |

Primary Examiner—Stephen M. Hepperle
Attorney, Agent, or Firm—Pearne, Gordon, McCoy & Granger

[57] ABSTRACT

A combined refrigerator/freezer unit provides a step motor driven damper for adjusting the relationship between the amount of chilled air delivered to the freezer compartment and the amount of chilled air delivered to the refrigeration department. The step motor, and in turn, the damper, is controlled by a integrated circuit which receives signals from temperature sensors in each compartment. The control produces pulses which cause the step motor to readjust the position of the damper to correct temperature imbalances which exist within the two compartments. The step motor functions to move the damper to predetermined adjusted positions without requiring any feedback to establish the actual position of the damper before and after each adjustment. The control also functions during defrost to cause the evaporator temperature to be raised prior to the operation of the defrost heaters.

10 Claims, 1 Drawing Sheet

TEMPERATURE CONTROL SYSTEM FOR REFRIGERATOR/FREEZER COMBINATIONS

BACKGROUND OF THE INVENTION

This invention relates generally to refrigerators having a separate freezer compartment and more particularly to a novel and improved automatic damper control system for automatically maintaining the desired temperatures in each of the refrigerator compartment and freezer compartment.

PRIOR ART

Refrigerators with separate freezer compartments are well known. Typically such refrigerators fall into two categories. One typical type provides a freezer compartment above the refrigerator compartment. The other, referred to as a side-by-side, provide a refrigerator compartment along one side of the unit and a freezer compartment along the other side of the unit. Both types have a separate door for each compartment.

Domestic units of such types are cooled by a single compressor, condenser and evaporator. Usually the evaporator is located in or near the freezer compartment. A fan operates to circulate air over the evaporator and through the two compartments. An adjustable baffle controls the ratio of the amounts of chilled air circulated through each of the compartments. Usually a temperature sensor in the refrigerator compartment controls the operation of the compressor to maintain a closely controlled, relatively constant temperature in the refrigeration compartment. The temperature in the freezer compartment is determined by the position of the damper, which in turn controls the division of the chilled air after it passes over the evaporator. The damper usually operates to cause the majority of the chilled air to pass through the freezer compartment so that the freezer is maintained at a lower freezing temperature while the refrigerator compartment is maintained at a temperature close to, but above freezing.

When a manually adjustable damper is provided, it is common that the freezer compartment is maintained at a lower temperature than necessary for proper frozen storage. When that occurs, energy consumption of the unit is higher than necessary.

It is also known to provide automatic baffle positioning means which are intended to maintain the desired temperature in the two compartments. The U.S. Pat. Nos. 3,288,370, 4,276,754, 4,282,720, 4,682,474, 4,688,393, 4,732,010, 4,819,442, 4,920,758 and 4,924,680, all describe systems of such type. The U.S. Pat. No. 3,288,370 describes a thermostatic system. Others describe solenoid driven systems. Still others combined a motor drive cam which also functions to control defrost operation.

It is also known to drive the baffle with a D.C. motor through reduction gearing. It is understood that such system controls the amount of baffle movement by timing the operation of the motor.

SUMMARY OF INVENTION

In accordance with the present invention a step motor is connected to adjust and control the baffle position. An integrated circuit responsive to temperature signals produced by temperature sensors in each of the compartments operates to control the step motor. The system operates to maintain a predetermined temperature differential between the two compartments and the step motor moves the baffle through a precise number of degrees of rotation in the required direction to correct any imbalance in the two temperatures. Therefore, accurate temperature control is maintained in both compartments. The control for the step motor operates the step motor to a predetermined position each time power is first supplied to the refrigerator. Thereafter, the step motor position is accurately established by the number and direction of movement steps and it is not necessary to provide a feedback circuit to establish baffle position.

In the illustrated system, the compressor operation is controlled by the temperature of the refrigeration compartment and the temperature of the freezer compartment is controlled by maintaining a predetermined differential temperature between the two compartments. Therefore, the temperatures in the two compartments are accurately maintained under substantially all normal operating conditions.

In the illustrated system, the damper is located upstream from the chilled air inlet to the refrigeration compartment so that frost does not build up on the damper to prevent its movement by the step motor. Therefore, a simple direct drive connection is provided between the step motor and the baffle.

With this sample system, proper temperature control is efficiently and reliably achieved. These and other aspects of this invention are illustrated in the accompanying drawings and are described in the following specification.

DETAILED DESCRIPTION OF THE DRAWINGS

Figure 1:
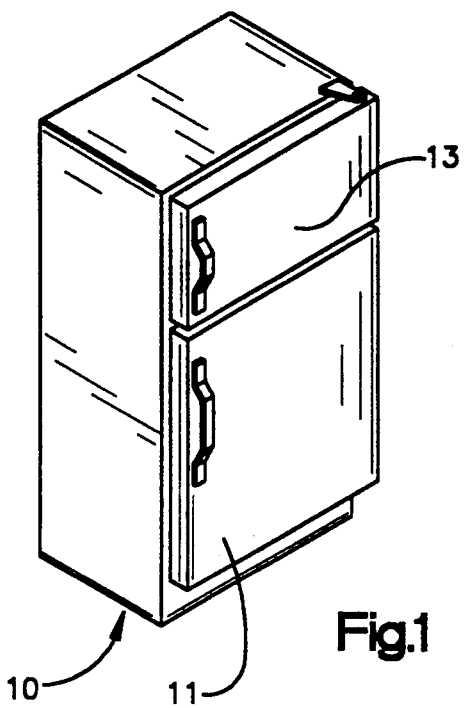
FIG. 1 illustrates a typical domestic refrigerator having a freezer compartment above the refrigeration compartment and incorporating this invention.

FIG. 1 illustrates a typical refrigerator 10 providing a lower door 11 providing access to a refrigeration compartment 12 (illustrated in FIG. 2) and an upper door 13 providing access to a freezer compartment 14. FIG. 1 merely illustrates one type of refrigerator/freezer combination to which the present invention is particularly suited. It should be understood, however, that the present invention is also applicable to other types of combined refrigerator/freezer units such as, for example, side-by-side units in which the refrigeration compartment is located along one side of the unit and the freezer compartment is located along the other side of the unit.

Figure 2:
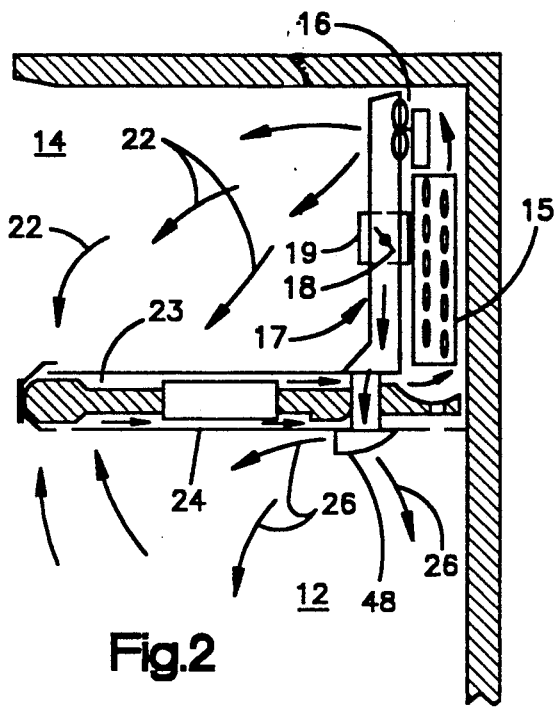
FIG. 2 is a schematic illustration of the chilled air distribution system and baffle.

With the present invention, both compartments 12 and 14 are cooled by a single refrigeration system having a single evaporator 15 which operates to chill air which is subsequently delivered to both of the compartments 12 and 14. FIG. 2 schematically illustrates a typical installation in which the evaporator 15 is located behind the freezer compartment 14. Air is drawn over the evaporator by a motor driven fan 16 and is delivered by such fan through a passage system 17 to the two compartments 12 and 14.

The passage system 17 is open to both the freezer compartment 14 and the refrigeration compartment 12 so that the air chilled as it passes over the evaporator functions to cool both compartments.

A damper 18 is located in the portion of the passage system leading to the refrigeration compartment and operates to control the relationship between the volume of chilled air delivered to the freezer compartment and the volume of chilled air delivered to the refrigeration compartment. Since the items stored in the refrigeration compartment require them to be maintained at a temperature above freezing while the items stored in the freezer compartment 14 are stored in a frozen condition in an environment below freezing, it is typical for the majority of the chilled air to be delivered to the freezer compartment and a lesser volume of chilled air to be delivered to the refrigeration compartment even though the freezer compartment is generally substantially smaller than the refrigeration compartment.

In a typical domestic refrigerator, the temperature in the refrigeration compartment 12 is maintained close to but above freezing, within a range of about 33° F. to 42° F. On the other hand, the temperature in the freezer compartment should be maintained within the range of about −5° F. to 8° F.

In many prior refrigerator/freezer combinations, the damper is manually adjusted and remains in the adjusted position until its position is subsequently again manually adjusted. Since the temperature balance between the two compartments is affected by the number of times the doors 11 and 13 are open to provide access to the respective compartments and the period of time the doors are left open, the tendency in the manual systems is to adjust the damper to maintain the freezer compartment excessively cold while controlling the refrigeration unit by a temperature sensor located in the refrigeration compartment. When the freezer compartment is maintained at excessively cold temperatures, excessive energy must be supplied to the unit for its operation. Further, items such as ice cream and the like may be much harder than necessary for good storage and therefore difficult to serve.

In order to improve efficiency and to more closely regulate the temperature of the freezer compartment and the refrigeration compartment, various systems have been proposed for automatically adjusting the position of the damper as described in the prior art section above. However, such prior art systems for the automatic positioning of the damper for adjusting the relationship between the amount of chilled air delivered to the freezer compartment and the amount of air delivered to the refrigeration compartment have encountered deficiencies not encountered with the present invention.

In accordance with the present invention, a step motor 19 is directly connected to the damper 18 and operates to control the position of the damper in response to temperatures existing in the two compartments so as to maintain the desired temperature in each compartment for efficient operation. The step motor is operated by an integrated circuit control 21 which operates to rotate the damper 18 to positions which automatically maintain the desired predetermined temperatures in the two compartments.

Figure 3:
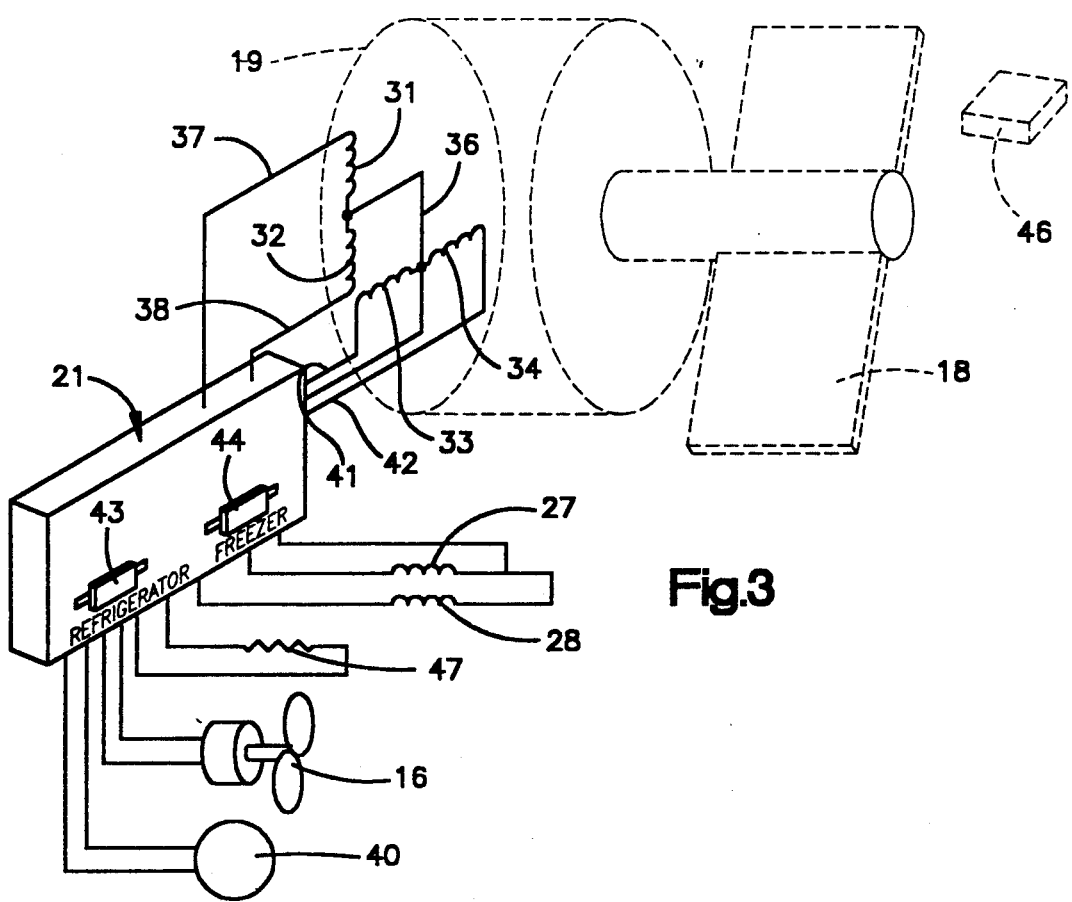
FIG. 3 is a schematic diagram of the control system which controls the operation of the refrigerator.

As illustrated in FIG. 3, the fan 16 operates to draw air over the evaporator 15 and discharges the chilled air into the passage system 17. Some of the air indicated by the arrows 22 passes through the freezer compartment 14 and into a return passage 23 provided within the wall 24 separating the two compartments. Return passage 23 functions to return the air to the evaporator 15 where it is recirculated.

The portion of the chilled air delivered to the refrigeration compartment flows past the damper 18 and is discharged from the passage system 17 into the refrigeration compartment 12 as represented by the arrows 26. Here again, such air is recirculated back through the return passage 23 to the evaporator 15.

FIG. 3 schematically illustrates the overall control system for the step motor 19 which in turn controls the position of the damper 18. Such control system includes a temperature sensor 27 positioned to sense the temperature in the freezer compartment 14 and a second temperature sensor 28 positioned to sense the temperature in the refrigeration compartment. Such temperature sensors may be of any suitable type but are preferably thermistors. The two temperature sensors 27 and 28 respectively connect with the integrated circuit of the control 21 and provide a signal which causes the control 21 to operate the step motor 19 through one or more steps of rotation so as to readjust the damper to correct any temperature imbalances determined by the two sensors 27 and 28.

The illustrated step motor 19 is provided with four coils 31, 32, 33 and 34. The center of the pair of coils 31 and 32 is connected to the center of the pair of coils 33 and 34 by a common connector 36 which also connects to the control 21. The opposite ends of the coils 31 and 32 are respectively connected by connectors 37 and 38 to the control 21. Similarly, the opposite ends of the pairs of coils 33 and 34 are respectively connected to the control by conductors 41 and 42. The pair of coils 31 and 32 are positioned perpendicular to the pair of coils 33 and 34.

The control 21 functions to operate the step motor 19 by supplying thereto a sequence of pulses causing the step motor to move with stepwise motion through a predetermined angle. In the illustrated embodiment, the step motor rotates through 15 degrees in each step and is operable to rotate the damper from a closed position in which it extends across the adjacent portion of the passage system to block any flow of chilled air to the refrigeration compartment and a position 90 degrees of rotation therefrom in which the damper is aligned with the adjacent portion of the passage system 17 to allow the maximum flow of chilled air to the refrigeration compartment. The control 21 is also connected to control the operation of the fan 16 and the compressor 40 of the refrigeration system in response to signals generated by the two temperature sensors 27 and 28.

In the preferred embodiment, the control also provides a potentiometer associated with each of the sensors 27 and 28 to allow user adjustment of the desired predetermined temperature in each compartment. In a typical system in which the temperature of the freezer compartment can be adjusted by the user within the range of −5° F. and 8° F., the control provides a user adjusted control 44 allowing the user to adjust the desired temperature within the freezer compartment within that range. Similarly, in a typical unit in which the refrigeration compartment 12 can be adjusted within the range of 33° F. to 42° F., the control provides a user adjusted control 43 permitting adjustment of the temperature in the refrigeration compartment within that range.

In a typical installation, the signal generated by the temperature sensor 27 as adjusted by the user adjustment 43 is also used to control the operation of the fan 16 and the compressor 40. Typically, the control 21 functions during normal operation to energize the fan 16 and the compressor 40 whenever the temperature within the refrigeration compartment, as determined by the temperature sensor 28 and user adjustment 43, is above the desired preset temperature for the refrigeration compartment. At the same time, the control operates the step motor 19 to move the damper toward a closed position if the signal generated by the temperature sensor 27, as modified by the user control 44, indicates that the freezer compartment temperature is above the desired predetermined temperature. Conversely, if the compressor 40 and fan 16 are operated to reduce the temperature in the refrigeration compartment back to the predetermined desired temperature therein while the freezer compartment 14 is below the desired predetermined temperature therein, the step motor 19 is caused to rotate the damper 18 to a more open position.

Because the step motor moves through predetermined increments of rotation (15 degrees in the illustrated embodiment) during each step of rotation, the precise position of the damper is established by the control for each condition which exists in the two compartments. Because the step motor moves to predetermined positions in response to the control 21, it is not necessary to provide a separate feedback circuit to establish the position of the damper. Instead, the control remembers the number of steps of movement in each direction, which have been previously made and therefore knows the position of the damper at all times.

The control is also preferably arranged to rotate the damper to a position against a fixed stop, schematically illustrated at 46, each time power is initially supplied to the refrigerator so that the control can establish a reference position at the commencement of the operation of the refrigerator. If, however, the control is provided with a permanent memory which would survive power outages or period in which the refrigerator is disconnected, such operation and stop need not be utilized.

Because the step motor provides complete control of the position of the damper, improved efficiency during defrost cycles can also be accomplished. Such improved efficiency can be achieved by causing the evaporator to warm up during a first portion of the defrost cycle. During such portion, the control operates the fan 16 without operation of the defrost heater 47. During this portion of the defrost cycle, the maximum amount of air from the refrigeration compartment is circulated over the evaporator to cause it to warm to a temperature approaching the temperature of the refrigeration compartment.

In a second portion of the defrost cycle, the control discontinues the operation of the fan and moves the damper to a fully closed position while energizing the defrost heater 47. Because the evaporator has already been warmed to a substantial extent, the amount of energy required to complete the defrost operation is minimized. During a third portion of the defrost cycle after the heater 47 has been turned off, the control operates the compressor while the fan remains off and the baffle remains closed. This allows quick lowering of the temperature of the evaporator so that normal operation can then be commenced.

Because the step motor 19 in cooperation with the control 21 accurately positions the damper 18, such efficient defrost operation can be easily performed.

Once the defrost cycle is completed, the control 21 and the step motor function to automatically achieve and maintain the desired temperatures in the two compartments 12 and 14 and an energy efficient system results.

In a typical system the control operates at intervals, such as three-minute intervals, to determine the temperatures in each compartment and makes appropriate adjustment of the baffle, either in a closed direction or an opening direction, as required to reestablish the correct temperature in each compartment. This minimizes the tendency for hunting and allows a time interval for the temperatures to stabilize after the baffle position has been adjusted.

Because the tendency for frost build up in the passage system is greatest where the passage system opens into the refrigeration compartment, the damper is located within the passage system 17 at a position upstream from the discharge 48 of the passage system into the refrigeration compartment. Such location upstream from the discharge 48 is selected s that frost does not restrict the operation of the step motor.

Although the preferred embodiment of this invention has been shown and described, it should be understood that various modifications and rearrangements of the parts may be resorted to without departing from the scope of the invention as disclosed and claimed herein.

What is claimed is:

1. A refrigerator/freezer combination comprising a refrigeration compartment for the storage of unfrozen items, a freezer compartment for the storage of frozen items, a refrigeration system including a compressor and an evaporator for cooling both compartments, passage means connecting both compartments, a fan operable to cause flow of air over said evaporator and to deliver air chilled by said evaporator to said passage means, an adjustable damper in said passage means operable to determine the division between the amount of chilled air delivered to said refrigeration compartment and the amount of chilled air delivered to said freezer compartment, a step motor connected to rotate said damper between a plurality of predetermined positions for controlling said division, and control means including a first temperature sensor means in said refrigeration compartment and a second temperature sensing means in said freezer compartment, said control means operating said step motor to adjust said damper in response to signals from said first and second temperature sensing means and thereby adjust said division of chilled air to maintain a predetermined temperature differential between said compartments.

2. A refrigerator/freezer combination as set forth in claim 1 wherein said control means operates said step motor to move said damper to one of said predetermined positions each time power is first supplied to said refrigerator/freezer combination.

3. A refrigerator/freezer combination as set forth in claim 1 wherein said control allows said damper to remain in an adjusted position for a predetermined time interval to allow system stabilization before establishing whether or not said damper requires readjustment.

4. A refrigerator/freezer combination as set forth in claim 1 wherein said passage means provides a discharge opening into said refrigeration compartment, and said damper is positioned in said passage means upstream from said discharge opening.

5. A refrigerator/freezer combination as set forth in claim 1 wherein said control establishes the position of said damper after adjustment thereof without requiring a feedback signal.

6. A refrigerator/freezer combination as set forth in claim 1 wherein said damper is in a portion of said passage means communicating with the refrigeration compartment, and said step motor operates to move said damper between a closed position closing said portion of said passage means and an open position of minimum restriction to flow of chilled air through said portion of said passage means.

7. A refrigerator/freezer combination as set forth in claim 6 wherein damper rotates through substantially 90° between said open and closed positions, and said step motor is directly connected to said damper and is operable in 15° steps between said positions.

8. A refrigerator/freezer combination as set forth in claim 6 wherein said control provides a defrost cycle for defrosting said evaporator, said control providing:

(a) a first portion of said defrost cycle to warm said evaporator in which said damper is in said open position and said fan operates while said compressor is shut off;

(b) a second portion of said defrost cycle in which said damper is in said closed position, said fan and compressor are shut off, and a heater is operated to defrost said evaporator; and (c) a third portion of said defrost cycle in which said compressor is operated while said damper remains in said closed position and said fan remains shut off.

9. A refrigerator/freezer combination comprising a refrigeration compartment for storage of unfrozen items, a freezer compartment for storage of frozen items, a refrigeration system including a compressor and an evaporator for cooling both compartments, passage means connecting both of said compartments, a fan operable to cause flow of air over said evaporator and to deliver air chilled by said evaporator to said passage means, an adjustable damper in said passage means operable to determine the division between the amount of chilled air delivered to said refrigeration compartment and the amount of chilled air delivered to said freezer compartment, a step motor connected to rotate said damper between predetermined positions for controlling said division, and the control means including first temperature sensor means and said refrigeration compartment and a second temperature sensor means in said freezer compartment, said control means operating said step motor to adjust said damper in response to signals from said first and second temperature sensor means and thereby adjust the division of chilled air to maintain said compartments at a desired temperature, said first sensor means also operating to control the operation of said compressor, said control means operating said step motor to move said damper to one of said predetermined positions each time power is first supplied to said refrigerator/freezer combination.

10. A refrigerator/freezer combination, as set forth in claim 1, wherein said first temperature sensing means also controls the operation of said compressor to maintain a predetermined desired temperature in said refrigeration compartment.

* * * * *